United States Patent
Zhou (10) Patent No.: US 11,770,320 B2
(45) Date of Patent: Sep. 26, 2023

(54) METHOD AND SYSTEM FOR DOMAIN NAME RESOLUTION

(71) Applicant: Wangsu Science & Technology Co., Ltd., Shanghai (CN)

(72) Inventor: Wenjie Zhou, Shanghai (CN)

(73) Assignee: WANGSU SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/743,441

(22) Filed: May 12, 2022

(65) Prior Publication Data
US 2022/0272019 A1    Aug. 25, 2022

Related U.S. Application Data

(63) Continuation of application No. PCT/CN2021/098481, filed on Jun. 4, 2021.

(30) Foreign Application Priority Data

Jan. 13, 2021    (CN) .......................... 202110042870.5

(51) Int. Cl.
*H04L 12/00*    (2006.01)
*H04L 43/106*    (2022.01)
(Continued)

(52) U.S. Cl.
CPC ........ *H04L 43/106* (2013.01); *H04L 43/0864* (2013.01); *H04L 43/12* (2013.01); *H04L 61/4511* (2022.05); *H04L 61/5007* (2022.05)

(58) Field of Classification Search
CPC ... H04L 43/106; H04L 43/0864; H04L 43/12; H04L 61/4511; H04L 61/10
(Continued)

(56) References Cited

U.S. PATENT DOCUMENTS 7,886,023 B1    2/2011    Johnson
2008/0288470 A1    11/2008    Goutard et al.
(Continued)

FOREIGN PATENT DOCUMENTS

CN    101656762 A    2/2010
CN    102932451 A  *  2/2013    .......... H04L 61/1511
(Continued)

OTHER PUBLICATIONS

Jin, CN 102932451 A., Solving system specific to content distribution network, 2013, 6 Pages.*
(Continued)

*Primary Examiner* — Frantz Coby
(74) *Attorney, Agent, or Firm* — USCH Law, PC (57) ABSTRACT

A method for domain name resolution is provided, applied to a system for domain name resolution deployed in a scheduling cluster. The system includes a scheduling system, a probe system, and an analysis system. The scheduling system receives each query request from each DNS server, records each egress IP address of each local DNS server to generate a list of IP addresses to be probed, and reports the list of IP addresses to the probe system. The probe system distributes the list of IP addresses to each probe to probe each of IP addresses in the list through each probe. And the analysis system receives each probing result fed back by each probe, sets each authoritative DNS server for each local DNS server, and processes each domain name resolution request sent by each local DNS server through each authoritative DNS server.

18 Claims, 2 Drawing Sheets

(51) Int. Cl.
  *H04L 61/5007* (2022.01)
  *H04L 61/4511* (2022.01)
  *H04L 43/0864* (2022.01)
  *H04L 43/12* (2022.01)

(58) Field of Classification Search
  USPC .......................................................... 709/224
  See application file for complete search history.

(56) References Cited

U.S. PATENT DOCUMENTS

| | | |
|---|---|---|
| 2009/0164661 A1 | 6/2009 | Kim et al. |
| 2017/0207989 A1 | 7/2017 | Cai et al. |
| 2018/0375715 A1 | 12/2018 | Kaliski, Jr. et al. |
| 2021/0092088 A1 * | 3/2021 | Ramachandran ... H04L 63/1408 |

FOREIGN PATENT DOCUMENTS

| | | | |
|---|---|---|---|
| CN | 102932451 A | 2/2013 | |
| CN | 103051740 A | 4/2013 | |
| CN | 105262851 A | 1/2016 | |
| CN | 106888277 A | 6/2017 | |
| CN | 107360270 A | 11/2017 | |
| CN | 107395783 A | 11/2017 | |
| CN | 107623751 A | 1/2018 | |
| CN | 107980217 A | 5/2018 | |
| CN | 109150561 A | 1/2019 | |
| CN | 109347998 A | 2/2019 | |
| CN | 110474994 A | 11/2019 | |
| CN | 111327495 A | 6/2020 | |
| CN | 111726428 A | 9/2020 | |
| CN | 112769976 A | 5/2021 | |
| EP | 3389244 A1 * | 10/2018 | .......... H04L 61/1511 |
| WO | 2019010694 A1 | 1/2019 | |

OTHER PUBLICATIONS

Kyle Schomp, "Recursive resolver authoritative nameserver selection | APNIC Blog", Retrieved from the Internet: URL:https://blog.apnic.net/2019/08/16/recursive-resolver-authoritative-nameserver-selection/, Aug. 16, 2019, 6 pgs.

Deng N Kong S Shen Cnnic G, "Approach on optimizing DNS authority server placement; draft-deng-dns-authority-server-placement-00.txt", Internet Engineering Task Force, IETF; Standardworkingdraft, Internet Society (ISOC) 4, Rue Des Falaises CH-1205 Geneva, Switzerland, Jul. 4, 2014, 10 pgs.

Wangsu Science & Technology Co., Ltd., Extended European Search Report, EP 21887866.8, dated Dec. 8, 2022, 8 pgs.

Harmonious community, Topping replaces ping to test network latency, CSDN, Jul. 26, 2018, 6 pgs.

Network knowledge, What does the ping command TTL mean The ping value TTL is more or less normal, ITMemo.cn, Dec. 10, 2019, 5 pgs.

Zhen, Qin et al., Cloud sourcing domain name resolving service model, Journal on Communications, No. 2, vol. 23, Feb. 25, 2013, 8 pgs.

Wangsu Science & Technology Co., Ltd., International Search Report with English translation, PCT/CN2021/098481, dated Sep. 28, 2021, 7 pgs.

Wangsu Science & Technology Co., Ltd. CN First Office Action with English translation, CN 202110042870.5, dated Aug. 2, 2022, 27 pgs.

* cited by examiner

METHOD AND SYSTEM FOR DOMAIN NAME RESOLUTION

CROSS REFERENCE TO RELATED APPLICATIONS

The present disclosure is a continuation of PCT Patent Application No. PCT/CN2021/098481, entitled "METHOD AND SYSTEM FOR DOMAIN NAME RESOLUTION," filed Jun. 4, 2021, which claims priority to Chinese patent application No. 202110042870.5, entitled "METHOD AND SYSTEM FOR DOMAIN NAME RESOLUTION," filed Jan. 13, 2021, each of which is incorporated by reference herein in its entirety.

TECHNICAL FIELD

The embodiments of the present disclosure relate in general to Internet technology, and more specifically to a method and system for domain name resolution.

BACKGROUND

Figure 1:
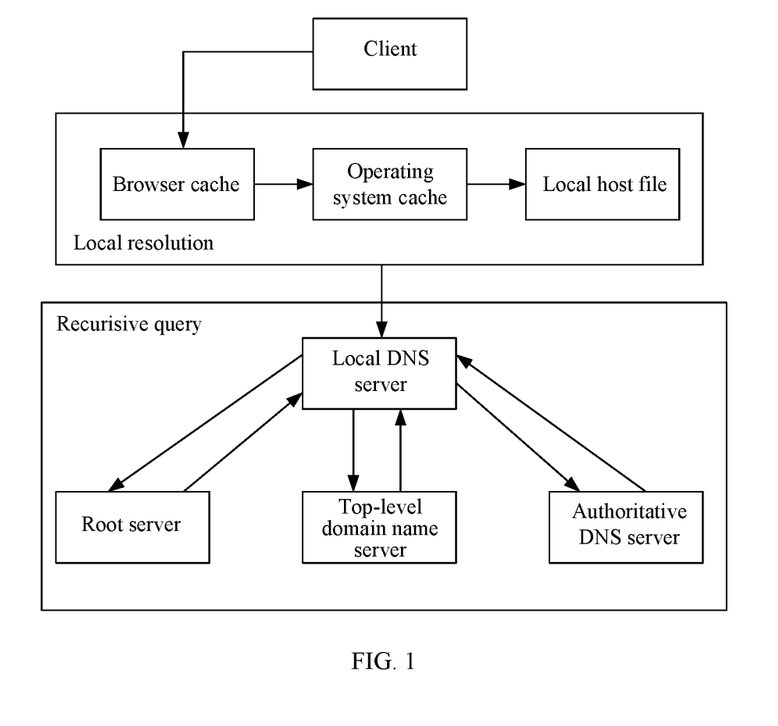
FIG. 1 shows an architecture of a system for domain name resolution in related technologies.

In some cases, a domain name resolution system typically includes a root server, a top-level domain name server, and an authoritative domain name system (DNS) server. As shown in FIG. 1, when a client initiates a domain name resolution request, the client first attempts to obtain a resolution result locally. If no resolution result is obtained from a local browser cache, an operating system cache, and a local host file, the domain name resolution request is able to be initiated to a local DNS server. The domain name resolution request is processed by the root server and then by the top-level domain name server. The top-level domain name server feeds back a name server (NS) record of the authoritative DNS server to the local DNS server. Finally, the local DNS server obtains the resolution result of the domain name from the authoritative DNS server, and provides the resolution result to the client, so that the client is able to initiate access to the domain name according to the resolution result.

In order to ensure the authoritative DNS server to be able to provide a good service for the local DNS server, the NS record of the authoritative DNS server is managed by region according to different regions and different operators, so as to enable the local DNS server to communicate with the best authoritative DNS server. In practical application, the region division of the NS record is usually carried out manually. However, the manual division method depends too much on human experience, which in many cases results in low accuracy of the region division and low efficiency of domain name resolution.

SUMMARY

The present disclosure is intended to provide a method and system for domain name resolution, which improve accuracy of region division of the NS record and efficiency of the domain name resolution.

Embodiments of the present disclosure provide a method for domain name resolution, including: at a system for domain name resolution deployed in a scheduling cluster, the system for domain name resolution including a scheduling system, a probe system, and an analysis system, receiving, by the scheduling system, each query request from each of a plurality of local domain name system (DNS) servers, recording each egress Internet protocol (IP) address of each of the plurality of local DNS servers to generate a list of IP addresses that are to be probed, and reporting the list of IP addresses to the probe system; distributing, by the probe system, the list of IP addresses to each of a plurality of probes to probe each of a plurality of IP addresses in the list of IP addresses through each of the plurality of probes; and receiving, by the analysis system, each probing result fed back by each of the plurality of probes, setting each authoritative DNS server for each of the plurality of local DNS servers, and processing each domain name resolution request sent by each of the plurality of local DNS servers through each authoritative DNS server.

Embodiments of the present disclosure provide a system for domain name resolution, deployed in a scheduling cluster, including: a scheduling system, a probe system, and an analysis system, wherein: a scheduling system, configured to receive each query request from each of a plurality of local DNS servers, record each egress IP address of each of the plurality of local DNS servers to generate a list of IP addresses that are to be probed, and report the list of IP addresses to a probe system; the probe system, configured to distribute the list of IP addresses to each of a plurality of probes to probe each of a plurality of IP addresses in the list of IP addresses through each of the plurality of probes; and an analysis system, configured to receive each probing result fed back by each of the plurality of probes, set each authoritative DNS server for each of the plurality of local DNS servers, and process each domain name resolution request sent by each of the plurality of local DNS servers through each authoritative DNS server.

As described above, in the technical solutions provided by one or more embodiments of the present disclosure, the scheduling system records each respective egress IP address of each of the local DNS servers when receiving each respective query request from each of the local DNS servers. The list of IP addresses to be probed is generated through the recorded egress IP addresses. This IP address list is distributed by the probe system to each of the probes distributed in different geographical locations. Each probe probes the IP addresses in the list of IP addresses, so as to obtain the probing results for different IP addresses. These probing results represent communication quality between the probe machine and the local DNS servers. By analyzing the probing results, the analysis system determines the probe having the best communication quality with the local DNS server. In this way, the analysis system is able to set a corresponding authoritative DNS server for the local DNS server based on the location of the probe. The authoritative DNS server set based on the probing results ensures good communication with the local DNS server. In this way, the probe machines in different geographical locations are used to probe the local DNS servers and divide the NS records of the local DNS servers by region according to the probing results, thereby improving accuracy of region division of the NS record and efficiency of the domain name resolution.

BRIEF DESCRIPTION OF THE DRAWINGS

In order to illustrate the technical solutions in the embodiments of the present disclosure more clearly, the accompanying drawings used in the description of the embodiments are briefly described below. It is apparent that the drawings in the following description are only some embodiments of the present disclosure. For those of ordinary skills in the art, other drawings may also be obtained according to these drawings without any creative effort.

DETAILED DESCRIPTION OF THE EMBODIMENTS

In order to make the objectives, technical solutions and advantages of the present disclosure clearer, embodiments of the present disclosure are described in details with reference to the accompanying drawings. It is apparent that the described embodiments are only a part of but not all of the embodiments of the present disclosure. Based on the embodiments of the present disclosure, all other embodiments obtained by those of ordinary skills in the art without any creative effort shall fall within the scope of the protection of the present disclosure.

Figure 2:
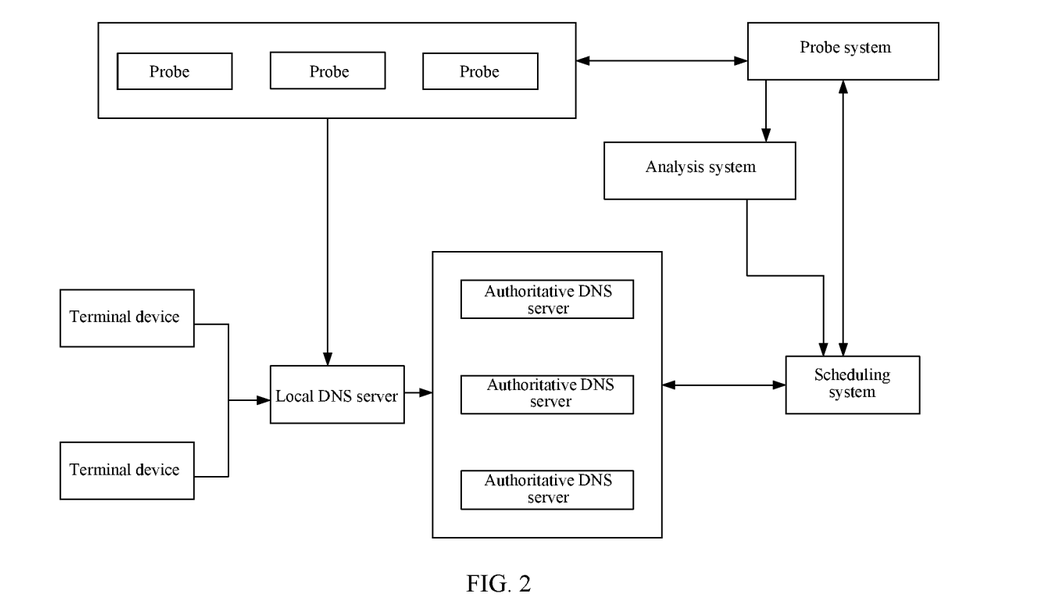
FIG. 2 shows an architecture a system for domain name resolution in accordance with some embodiments of the present disclosure.

The present disclosure provides a method for domain name resolution, which is applied to a system shown in FIG. 2. As shown in FIG. 2, the system is deployed in a scheduling cluster for providing services for a terminal device used by a user. The terminal device is able to communicate with a local DNS server. The local DNS server sends a query request to a top-level domain name server to query a NS record of an authoritative DNS server used to handle domain name resolution requests. A scheduling system aggregates an Internet protocol (IP) address list of the local DNS server and report the list of IP addresses to a probe system. The probe system issues the list of IP addresses to a plurality of probes distributed at different geographical locations so as to use the plurality of probes to probe the communication quality of an egress IP address of the local DNS server. The probing result is reported by the probe to an analysis system. After the analysis system resolves the probing result, an optimal NS record is set for each local DNS server, and the optimal NS record is issued to the scheduling system. Subsequently, the scheduling system adjusts the resolution result from the top-level domain name server, so that the best NS record is fed back to the local DNS server. The scheduling system, analysis system and probe system may be deployed on the same device in the scheduling cluster, or may be separately deployed on different devices, which is not specifically limited herein.

The method for domain name resolution provided in the present disclosure is applied to a scheduling cluster, and the method includes the following operations.

In S001, a query request is received from a DNS server, where the query request includes an egress IP address of the local DNS server, and the egress IP address of the local DNS server is probed through a probe.

In S002, server setting information fed back by an analysis system according to a probing result is sent to the local DNS server, where the server setting information includes an authoritative DNS server set for the local DNS server. In response to the authoritative DNS server in the server setting information being inconsistent with an authoritative DNS server currently used by the local DNS server, the local DNS server replaces the authoritative DNS server currently used with the authoritative DNS server in the server setting information.

In this embodiment, the authoritative DNS server currently used by the local DNS server may be an authoritative DNS server defined by a previous round of server setting information, or may be an authoritative DNS server set in a conventional manner. In the current period, the analysis system may set a more efficient authoritative DNS server for the local DNS server according to the probing results reported by each probe. In this way, if the authoritative DNS server in the server setting information is inconsistent with the authoritative DNS server currently used by the local DNS server, it indicates that a status of the current network has changed, and the local DNS server is able to dynamically change a corresponding authoritative DNS server.

Figure 3:
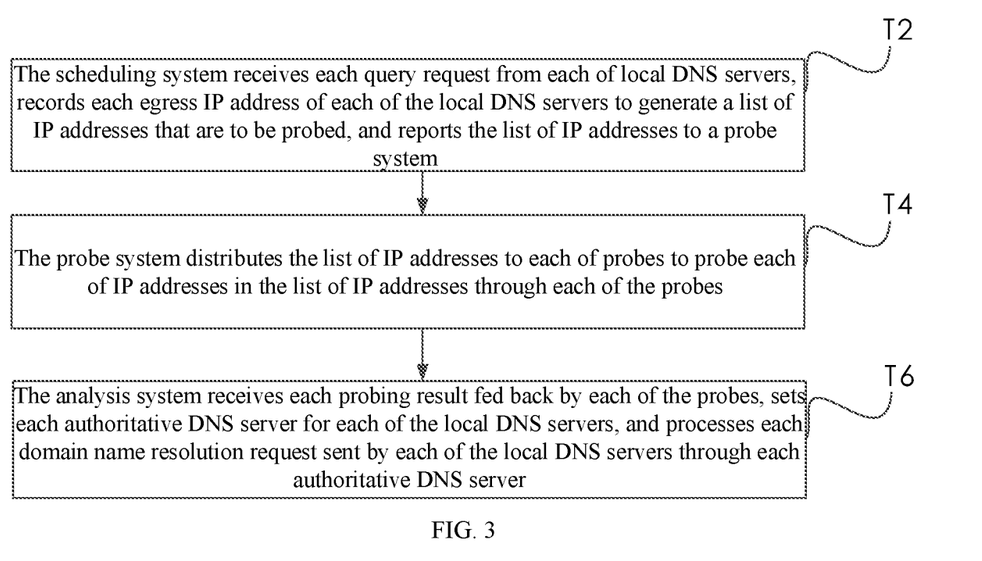
FIG. 3 is a schematic diagram of a method for domain name resolution in accordance with some embodiments of the present disclosure.

Specifically, referring to FIG. 2 and FIG. 3, a method for domain name resolution provided in an embodiment of the present disclosure may include the following operations.

In S1, the scheduling system receives each query request from each of local DNS servers, records each egress IP address of each of the local DNS servers to generate a list of IP addresses that are to be probed, and reports the list of IP addresses to a probe system.

In this embodiment, the terminal device sends the domain name resolution request to the local DNS server in response to being unable to locally obtain the cache information of the domain name resolution request. The domain name resolution request obtains the NS record of the top-level domain name server from a root server through recursive query, and then the local DNS server sends the query request to the top-level domain name server to obtain a NS record of a next-level authoritative DNS server. After receiving the query request from the local DNS server, the top-level domain name server may recursively query the corresponding NS record from the scheduling system. The scheduling system records the egress IP address of the local DNS server. In practical applications, a cluster of top-level domain name servers receives query requests from a plurality of local DNS servers, and the scheduling system records the egress IP addresses of these local DNS servers.

In one embodiment, considering that the number of recorded egress IP addresses is usually large, the scheduling system aggregates the recorded egress IP addresses in order to simplify the data processing process. In general, IP addresses having the same C segment may be considered to be of the same local DNS server, and therefore, the egress IP addresses of the respective local DNS servers are classified according to a specified address segment to obtain the classified egress IP addresses. The specified address segment may be the C segment described above. One or more of the classified egress IP addresses may be selected as the IP address to be probed. In this way, the number of the IP addresses to be probed is greatly reduced by IP address aggregation, and the network quality of the egress IP addresses of different local DNS servers is well characterized by the probing results.

In this embodiment, after the egress IP addresses are classified, corresponding service region identifiers are assigned to each class of egress IP addresses. The service region identifier may be jointly represented by a home location and a network operator. For example, the service region identifier may be "Fujian Telecom," "Shanghai Telecom," "Zhengzhou Netcom" and the like. After allocating a corresponding service region identifier for each class of egress IP addresses, each class of egress IP addresses carrying the service region identifiers may be aggregated into the list of IP addresses that are to be probed. In the list of IP addresses, one or more IP addresses to be probed selected above are included, and these IP addresses to be probed are bound to corresponding service region identifiers.

After obtaining the list of IP addresses to be probed, the scheduling system reports the list of IP addresses to the probe system.

In S3, the probe system distributes the list of IP addresses to each of probes to probe each of IP addresses in the list of IP addresses through each of the probes.

In this embodiment, in order to set an optimal authoritative DNS server for the local DNS server, the probe system probes the egress IP addresses of the local DNS server through the probes distributed at various geographical locations. By distributing the list of IP addresses to be probed generated in operation S1 to each of the probes, each of the IP addresses in the list of IP addresses is probed by the respective probes.

Take a target IP address in the list of IP addresses to be probed as an example. The target IP address may be probed with a regular PING command. Specifically, when a target IP address is probed using the PING command, a time to live (TTL) value is set to a maximum value (e.g., 64), and then a request packet is sent to the target IP address using the PING command. If s destination IP address does not feed back a response packet for the PING command, it indicates that the probing by a conventional probing means fails. In this case, an improved probe method may be performed.

In this embodiment, when performing the improved probe method, the TTL value is modified to a current reference tracking hop count, which may be 32 by default. The reference tracking hop count is updated with subsequent rounds of probing and is used as a basis for whether a new round of probing needs to be started.

In this embodiment, in order to improve a success rate of the probing of the target IP address, traceroute and a probe protocol are used together to probe the target IP address. Specifically, the traceroute parses a TTL field in the response packet fed back by the target IP address, or parses a TTL field in a timeout packet fed back by an intermediate gateway, so as to identify the TTL value carried in the response packet or the timeout packet. The target IP address is able to be probed through different probe protocols to be compatible with different network scenarios and improve the success rate of the probing.

Specifically, the plurality of probe protocols collectively constitute a probe protocol group in which the plurality of probe protocols are sorted according to priorities. For example, the probe protocols are sorted in descending order of priority. The probe protocols are used one by one to probe the target IP address.

In this embodiment, for a current probe protocol in the probe protocol group, the request packet is sent to the target IP address based on the current probe protocol. In response to the target IP address feeding back the response packet for the request packet, a time difference between the request packet and the response packet is calculated, and the time difference is taken as a round-trip time (RTT) corresponding to the probing succeeding.

In practical applications, the types of request packets and response packets are different depending on the probe protocols. For example, the probe protocol in the probe protocol group includes a user datagram protocol (UDP), then the request packet may be a UDP probe packet, and a corresponding response packet may be an Internet control message protocol (ICMP) destination unreachable packet. When the probe protocol in the probe protocol group includes a transmission control protocol (TCP), the request packet may be a TCP SYN probe packet, and a corresponding response packet may be a TCP ACK packet. When the probe protocol in the probe protocol group includes ICMP, the request packet may be an ICMP echo request probe packet, and a corresponding response packet may be an ICMP echo reply packet.

However, when the target IP address is probed based on the probe protocol, the timeout packet with the maximum TTL sent back by the intermediate gateway is acquired in response to the target IP address not feeding back the response packet for the request packet. Specifically, a probe device receives timeout packets from different intermediate gateways, and TTL fields in these timeout packets carry corresponding TTL values. Generally, the closer the intermediate gateway is to the destination IP address, the greater the TTL value carried in the TTL filed. Therefore, when the target IP address is unable to feed back the response packet, the acquired timeout packet of the intermediate gateway is parsed and the timeout packet with the maximum TTL value is identified. The time difference between the timeout packet and the request packet can then be calculated and used as the round-trip time corresponding to the successful probe.

In one embodiment, the intermediate gateway that sends back the timeout packet with the maximum TTL value is relatively far away from the target IP address. If the time difference calculated through the timeout packet is unable to accurately reflect the network quality between the target IP address and the probe device, a specified TTL threshold is set for the TTL value, and the specified TTL threshold is taken as a lower limit value of the TTL. If the TTL corresponding to the timeout packet is greater than or equal to the specified TTL threshold, it indicates that the timeout packet is a valid packet, and in this case, the time difference between the timeout packet and the request packet is calculated based on the above method. If the TTL corresponding to the timeout packet is less than the specified TTL threshold, it indicates that the intermediate gateway sending back the timeout packet is too far from the target IP address, so that the timeout packet is discarded and the target IP address is probed using a next probe protocol.

In this embodiment, if all the probe protocols used one by one according to the priority fail to probe the target IP address, it indicates that a current round of probing of the probe protocol group fails. In this case, it is determined whether to update the reference tracking hop count according to the value of the reference tracking hop count, and whether to terminate the probing of the target IP address.

Specifically, in response to the current reference tracking hop count being greater than a minimum tracking hop count, the reference tracking hop count is decreased and the decreased tracking hop count is taken as a reference tracking hop count for a next round of probing. The minimum tracking hop count may be an empirical value in the network quality probing process. For example, the minimum tracking hop count is 6, then in response to a current reference tracking hop count being greater than 6, the current reference tracking hop count is decreased by 1, and the obtained result is taken as the reference tracking hop count for the next round of probing. In this way, in the next round of probing, the probe protocols in the probe protocol group are used one by one to probe the target IP address based on the above method. If the probing still fails, the updated reference tracking hop count is compared with the minimum tracking hop count to determine whether to continue to update the reference tracking hop count, so as to perform a next round of probing.

In response to the current reference trace hop count being less than or equal to the minimum trace hop count after the probing performed by using the probe protocol group fails, it is determined that the probing of the target IP address fails, the probing for the target IP address is terminated, and a value of the round-trip time (RTT) of the target IP address is recorded as an abnormal value.

It should be noted that a conventional network quality probe means is to probe the target IP address through the PING command under Linux. Each probing requires a process to be started, which consumes a lot of system resources. Meanwhile, each probing records an initial state of the probing and block the response packets waiting to be returned by the probing, which is not conductive to large-scale probing due to low probe efficiency.

However, in the improved probe method, the operation of transmitting the request packet and the operation of receiving the response packet in the probing process are separated from each other and are respectively handled by separate modules, which greatly reduces the waiting time of receiving and transmitting synchronization and memory read/write lock, thereby greatly improving the probe efficiency. In the probing process, the identifier, packet transmitting time, TTL value and other required fields required for calculating the RTT value are recorded by encapsulating into a protocol packet header and a protocol packet body, and obtained by parsing the protocol packet when returned.

In a specific application scenario, the probing is performed in an order of UDP, TCP, and ICMP. Specifically, the probing process includes the following operations.

1) UDP Mode

The probe sends a UDP probe packet to the destination IP address.

When the destination IP address sends back the ICMP destination unreachable packet, the time difference between the ICMP destination unreachable packet and the UDP probe data is calculated as the RTT value.

When the destination IP address does not respond to the ICMP destination unreachable packet, an ICMP TTL timeout packet sent back by the intermediate gateway with the maximum TTL value is obtained, and the time difference between the ICMP TTL timeout packet and the UDP probe packet is calculated as the RTT value.

When the maximum TTL value is less than a latest allowed TTL value, a corresponding ICMP TTL timeout packet is discarded and another protocol is attempted.

2) TCP Mode

The probe sends a TCP [SYN] probe packet to the destination IP address.

When the destination IP address sends back a TCP [SYN ACK] packet, the time difference between the TCP [SYN ACK] packet and the TCP [SYN] probe packet is calculated as the RTT value.

When the destination IP address does not respond to the TCP [SYN ACK] packet, the ICMP TTL timeout packet sent back by the intermediate gateway with the maximum TTL value is obtained, and the time difference between the ICMP TTL timeout packet and the TCP [SYN] probe packet is calculated as the RTT value.

When the maximum TTL value is less than the latest allowed TTL value, the ICMP TTL timeout packet is discarded and another protocol is attempted.

3) ICMP Mode

The probe sends an ICMP echo request probe packet to the destination IP address.

When the destination IP address sends back an ICMP echo reply packet, the time difference between the ICMP echo reply packet and the ICMP echo request probe packet is calculated as the RTT value.

When the destination IP address does not respond to the ICMP echo reply packet, the ICMP TTL timeout packet sent back by the intermediate gateway with the maximum TTL value is obtained, and the time difference between the ICMP TTL timeout packet and the ICMP echo request probe packet is calculated as the RTT value.

When the maximum TTL value is less than the latest allowed TTL value, the ICMP TTL timeout packet is discarded and the destination IP address is recorded as being unable to be probed.

In S5, the analysis system receives each probing result fed back by each of the probes, sets each authoritative DNS server for each of the local DNS servers, and processes each domain name resolution request sent by each of the local DNS servers through each respective authoritative DNS server.

In this embodiment, for each local DNS server, the probing results respectively corresponding to each probe are obtained through the above modes, and these probing results represent the communication quality between the probes and the local DNS server. These probing results are fed back to the analysis system by each probe, or are summarized by the probe system and sent to the analysis system. In practical applications, for the same local DNS server, the analysis system sorts the probing results of the probes from best to worst, and screens out the top one or more probes based on the sorting result.

For the probe that are screened out, it is considered that the communication quality between the regions where the probes are located and the egress IP address of the local DNS server is relatively good, and then the authoritative DNS servers in the regions where these probes are located are able to provide the domain name resolution service for the local DNS server. In practical applications, the authoritative DNS servers in the regions where each of the screened-out probes is located are determined, and a collection of these authoritative DNS servers is constructed as a list of candidate authoritative DNS servers. In this list, the authoritative DNS servers are sorted according to the probing results of the probes respectively corresponding to the authoritative DNS servers. The authoritative DNS server with a better probing result has a higher priority.

In one embodiment, if an optimal authoritative DNS server needs to be set for the current local DNS server, the target sounding machine corresponding to the optimal sounding result for the local DNS server may be queried. The authoritative DNS server in the zone where the target probe is located can then be set as the authoritative DNS server corresponding to the local DNS server.

When the authoritative DNS server is set for the local DNS server, a region where the local DNS server is located and a network operator the local DNS server is supported are identified, the IP address of the set authoritative DNS server is obtained, and finally, a mapping relationship among the region where the local DNS server is located, the network operator, and the IP address of the authoritative DNS server is constructed. For example, if the region where the local DNS server is located is "Fujian," the network operator is "Telecom," and the IP address of the authoritative DNS server is "1.1.1.1," then the mapping relationship of "Fujian Telecom: 1.1.1.1" is constructed to provide services for the local DNS server of Fujian Telecom through the authoritative DNS server whose IP address is "1.1.1.1."

In the list of candidate authoritative DNS servers, the constructed mapping relationships are arranged in order of priority, and one mapping relationship is selected from the list to provide services for the local DNS server according to requirements of actual application scenarios.

In this embodiment, the analysis system sends the list of candidate authoritative DNS servers of the local DNS server to the scheduling system after obtaining the list by analyzing the probing results. Subsequently, the top-level domain name server first designates an authoritative DNS server for a current local DNS server in a conventional manner after receiving the query request from the current local DNS server, and an IP address of the designated authoritative DNS server is taken as a resolution IP address fed back for the current local DNS server. The top-level domain name server then sends the resolution IP address to the scheduling system. After receiving the resolution IP address, the scheduling system compares the resolution IP address with the IP address of the authoritative DNS server designated for the current local DNS server. In response to the resolution IP address being consistent with the IP address of the designated authoritative DNS server, the scheduling system notifies the top-level domain name server and feeds back the resolution IP address to the local DNS server. In response to the resolution IP address being inconsistent with the IP address of the designated authoritative DNS server, the scheduling system replaces the resolution IP address with the IP address of the authoritative DNS server designated for the current local DNS server, so that the replaced IP address is fed back to the current local DNS server through the top-level domain name server. In this way, by intervention of the NS scheduling system, the top-level domain name server is able to provide the resolution IP address of the authoritative DNS server with better communication quality to the local DNS server according to the probing results of the probes.

In one embodiment, the probes are able to periodically probe the communication quality with the local DNS server. When the networks between the probes and the local DNS server fluctuate, which causes deterioration of the communication quality, the analysis system dynamically adjusts the authoritative DNS server set for the local DNS server according to real-time probing results. Specifically, if a probing result of a target probe for a target local DNS server at the current time indicates that the network is abnormal, the communication quality between the authoritative DNS server in the region where the target probe is located and the target local DNS server may be deteriorated. In this case, the analysis system queries a target authoritative DNS server in the region where the target probe is located, and reduces the priority of the target authoritative DNS server in the list of candidate authoritative DNS servers of the target local DNS server. The probing result indicating the network anomaly includes a plurality of cases. For example, the network anomaly may be that the target probe is unable to access the target local DNS server, or may be that a communication index between the target probe and the target local DNS server is below a fixed threshold, or may be the communication index decreases by a certain percentage compared to the previous communication index, etc. In this way, when the network anomaly occurs, the priority of the target authoritative DNS server is lowered in time (for example, the priority of the target authoritative DNS server is lowered to the lowest level), so that an optimal authoritative DNS server is re-set for the target local DNS server according to the list of candidate authoritative DNS servers of which the priorities have been adjusted. By means of this dynamic adjustment, communication quality of a public network is perceived in time, and dynamic scheduling of the authoritative DNS server is realized, thereby ensuring stability of the domain name resolution process.

The present disclosure further provides a system for domain name resolution, and the system includes a scheduling system, a probe system, and an analysis system. The scheduling system is configured to receive each query request from each of local DNS servers, record each egress IP address of each of the local DNS servers to generate a list of IP addresses that are to be probed, and report the list of IP addresses to a probe system. The probe system is configured to distribute the list of IP addresses to each of probes to probe each of IP addresses in the list of IP addresses through each of the probes. The analysis system is configured to receive each probing result fed back by each of the probes, set each authoritative DNS server for each of the local DNS servers, and process each domain name resolution request sent by each of the local DNS servers through each authoritative DNS server.

As described above, in the technical solutions provided by one or more embodiments of the present disclosure, the scheduling system records each respective egress IP address of each of the local DNS servers when receiving each respective query request from each of the local DNS servers. The list of IP addresses to be probed is generated through the recorded egress IP addresses. This IP address list is distributed by the probe system to each of the probes distributed in different geographical locations. Each probe probes the IP addresses in the list of IP addresses, so as to obtain the probing results for different IP addresses. These probing results represent communication quality between the probe machine and the local DNS servers. By analyzing the probing results, the analysis system determines the probe having the best communication quality with the local DNS server. In this way, the analysis system is able to set a corresponding authoritative DNS server for the local DNS server based on the location of the probe. The authoritative DNS server set based on the probing results ensures good communication with the local DNS server. In this way, the probe machines in different geographical locations are used to probe the local DNS servers and divide the NS records of the local DNS servers by region according to the probing results, thereby improving accuracy of region division of the NS record and efficiency of the domain name resolution.

Various embodiments in this specification are described in a progressive manner, the same and similar parts among the various embodiments may be referred to each other, and each embodiment focuses on differences from the other embodiments. In particular, for the embodiments of the system, reference may be made to the description of the foregoing method embodiments.

Those skilled in the art should appreciate that embodiments of the present disclosure may be provided as methods, systems, or computer program products. Accordingly, the present disclosure may take the form of an entirely hardware embodiment, an entirely software embodiment, or an embodiment combining software and hardware aspects. Moreover, the present disclosure may take the form of a computer program product implemented on one or more computer readable storage media (including, but not limited to, a magnetic disk memory, a compact disc read-only memory (CD-ROM), an optical memory, etc.) in which computer readable program code is contained.

The present disclosure is described with reference to flowcharts and/or block diagrams of methods, devices (systems), and computer program products according to the present disclosure. It should be understood that each flow and/or block in the flowcharts and/or block diagrams and the combination of the flow and/or block in the flowcharts and/or block diagrams may be implemented by computer program instructions. These computer program instructions may be provided to processors of a general-purpose computer, a dedicated computer, an embedded processor, or other programmable data processing devices to generate a machine such that instructions executed by the processors of the computer or other programmable data processing devices generate apparatus for implementing the functions specified in one or more flows of the flowcharts and/or one or more blocks of the block diagrams.

These computer program instructions may also be stored in a computer readable memory capable of directing a computer or other programmable data processing devices to operate in a particular manner such that instructions stored in the computer readable memory produce manufactures including instruction apparatus, and the instruction apparatus implements functions specified in one or more flows of the flowcharts and/or in one or more blocks of the block diagrams.

These computer program instructions may also be loaded onto a computer or other programmable data processing devices such that a series of operations are performed on the computer or other programmable devices to generate computer-implemented processing, such that the instructions executed on the computer or other programmable devices provide operations for implementing the functions specified in one or more flows of the flowcharts and/or in one or more blocks of the block diagrams.

In a typical configuration, a computing device includes one or more processors, such as a central processing unit (CPU), an input/output interface, a network interface, and memory.

Memory may include non-persistent memory, random access memory (RAM), and/or non-volatile memory in a computer readable medium, such as read-only memory (ROM) or flash RAM. Memory is an example of the computer readable medium.

Computer readable medium, including persistent and non-persistent, removable and non-removable media, in which information storage may be implemented by any method or technology. Information may be computer readable instructions, data structures, modules of programs, or other data. Examples of storage medium for a computer include, but are not limited to, phase-change random access memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storage, magnetic cassette tape, magnetic tape disk storage or other magnetic storage devices or any other non-transmission medium that may be used to store information accessible by the computing device. As defined herein, the computer readable medium does not include transitory media, such as modulated data signals and carriers.

It should also be noted that the terms "include," "comprise" or any other variation thereof are intended to cover non-exclusive inclusion so that a process, method, item or device that includes a set of elements includes not only those elements but also other elements not explicitly listed, or elements inherent to the process, method, item or device. Without further limitation, the element defined by the statements "include a . . . ," "comprise a . . . " does not exclude the existence of other identical elements in the process, method, item or device that includes the element.

The above description is merely embodiments of the present disclosure, and is not intended to limit the present disclosure. For those skilled in the art, various modifications and variations may be made to the present disclosure. Any modifications, equivalent replacements, improvements, etc. made within the spirit and principles of the present disclosure shall fall within the scope of the appended claims of the present disclosure.

What is claimed is:

1. A method for domain name resolution, comprising:
at a system for domain name resolution deployed in a scheduling cluster, the system for domain name resolution including a scheduling system, a probe system, and an analysis system,
receiving, by the scheduling system, one or more query requests from each of a plurality of local domain name system (DNS) servers, recording an egress Internet protocol (IP) address of each of the plurality of local DNS servers to generate a list of IP addresses that are to be probed, and reporting the list of IP addresses to the probe system;
distributing, by the probe system, the list of IP addresses to a plurality of probes, each of the plurality of probes to probe a respective plurality of IP addresses in the list of IP addresses; and
receiving, by the analysis system, probing result fed back by each of the plurality of probes, setting an authoritative DNS server for each of the plurality of local DNS servers, and processing each domain name resolution request sent by each of the plurality of local DNS servers through a corresponding authoritative DNS server;
wherein generating the list of IP addresses that are to be probed comprises:
classifying the egress IP address of each of the plurality of local DNS servers based on a specified address segment to obtain classified egress IP addresses for the plurality of local DNS servers; and
allocating a service region identifier to each class of the classified egress IP addresses, and aggregating each class of the classified egress IP addresses carrying service region identifiers into the list of IP addresses.

2. The method according to claim 1, wherein probing the respective plurality of IP addresses in the list of IP addresses through each of the plurality of probes comprises:
setting a reference tracking hop count for a time to live in response to that probing for a target IP address fails;
probing the target IP address through a detection protocol group;
in response to the probing succeeding, recording a round-trip time corresponding to the probing succeeding, and terminating the probing for the target IP address; and
in response to the probing failing, determining whether to update the reference tracking hop count, and determining whether to terminate the probing for the target IP address.

3. The method according to claim 2, wherein probing the target IP address through the probe protocol group comprises:
sending a request packet to the target IP address based on a current probe protocol in the probe protocol group; and
in response to the target IP address feeding back a response packet to the request packet, calculating a time difference between the request packet and the response packet, and taking the time difference as the round-trip time corresponding to the probing succeeding.

4. The method according to claim 3, wherein a probe protocol in the probe protocol group includes a user datagram protocol (UDP), the request packet is a UDP probe packet, and the response packet is an Internet control message protocol (ICMP) destination unreachable packet;

the probe protocol in the probe protocol group includes a transmission control protocol (TCP), the request packet is a TCP SYN probe packet, and the response packet is a TCP ACK packet; and the probe protocol in the probe protocol group includes an Internet control message protocol (ICMP), the request packet is an ICMP echo request probe packet, and the response packet is an ICMP echo reply packet.

5. The method according to claim 3, further comprising:
In response to the target IP address not feeding back the response packet for the request packet, acquiring a timeout packet with a maximum time to live sent back by an intermediate gateway by the probe system; and
calculating, by the probe system, a time difference between the timeout packet and the request packet, and taking the time difference as the round-trip time corresponding to the probing succeeding.

6. The method according to claim 5, wherein before calculating the time difference between the timeout packet and the response packet, the method further comprises:
in response to a time to live corresponding to the timeout packet being greater than or equal to a specified time to live threshold, calculating the time difference between the timeout packet and the request packet by the probe system; and
in response to the time to live corresponding to the timeout packet being less than the specified time to live threshold, discarding the timeout packet and using a next probe protocol to probe the target IP address by the probe system.

7. The method according to claim 2, wherein determining whether to update the reference tracking hop count comprises:
in response to the reference tracking hop count being greater than a minimum tracking hop count, decreasing the reference tracking hop count, and taking the decreased tracking hop count as the reference tracking hop count for a next round of probing.

8. The method according to claim 2, wherein determining whether to terminate the probing for the target IP address comprises:
in response to the reference tracking hop count being less than or equal to a minimum tracking hop count, determining that the target IP address probe fails, and terminating the probing for the target IP address.

9. The method according to claim 1, wherein setting an authoritative DNS server for each of the plurality of local DNS servers comprises:
querying a target probe corresponding to an optimal probe result for a current local DNS server; and
setting an authoritative DNS server in a region where the target probe is located as an authoritative DNS server corresponding to the current local DNS server.

10. The method according to claim 1, wherein setting an authoritative DNS server for each of the plurality of local DNS servers comprises:
for any one local DNS server in the local DNS servers:

identifying a region where the local DNS server is located and a network operator that the local DNS server supports;
obtaining an IP address of an authoritative DNS server set for the local DNS server; and
constructing a mapping relationship among the region where the local DNS server is located, the network operator, and the IP address of the authoritative DNS server.

11. The method according to claim 9, wherein setting an authoritative DNS server for each of the plurality of local DNS servers comprises:
for any one local DNS server in the local DNS servers:
identifying a region where the local DNS server is located and a network operator that the local DNS server supports;
obtaining an IP address of an authoritative DNS server set for the local DNS server; and
constructing a mapping relationship among the region where the local DNS server is located, the network operator, and the IP address of the authoritative DNS server.

12. The method according to claim 1, wherein processing each domain name resolution request sent by each of the plurality of local DNS servers through the corresponding authoritative DNS server comprises:
sending a resolution IP address fed back for a current local DNS server to the scheduling system to compare the resolution IP address with an IP address of an authoritative DNS server set for the current local DNS server through the scheduling system; and
in response to the resolution IP address being inconsistent with the IP address of the authoritative DNS server set for the current local DNS server, replacing the resolution IP address with the IP address of the authoritative DNS server set for the current local DNS server, and feeding back the replaced IP address to the current local DNS server.

13. The method according to claim 1, further comprising:
in response to a probe result of a target local DNS server at a current time indicating network anomaly, querying a target authoritative DNS server in a region where the target local DNS server is located by the analysis system, and reducing a priority of the target authoritative DNS server in a list of candidate authoritative DNS servers of the target local DNS server by the analysis system.

14. A system for domain name resolution, deployed in a scheduling cluster, comprising: a scheduling system, a probe system, and an analysis system, wherein:
a scheduling system, configured to receive one or more query requests from each of a plurality of local DNS servers, record an egress IP address of each of the plurality of local DNS servers to generate a list of IP addresses that are to be probed, and report the list of IP addresses to a probe system;
the probe system, configured to distribute the list of IP addresses to a plurality of probes, each of the plurality of probes to probe a respective plurality of IP addresses in the list of IP addresses; and
an analysis system, configured to receive probing result fed back by each of the plurality of probes, set an authoritative DNS server for each of the plurality of local DNS servers, and process each domain name resolution request sent by each of the plurality of local DNS servers through a corresponding authoritative DNS server;

wherein the scheduling system is further configured to:
classify the egress IP address of each of the plurality of local DNS servers based on a specified address segment to obtain classified egress IP addresses for the plurality of local DNS servers; and
allocate a service region identifier to each class of the classified egress IP addresses, and aggregate each class of the classified egress IP addresses carrying each service region identifiers into the list of IP addresses.

15. The system according to claim 14, wherein the probe system is further configured to:
set a reference tracking hop count for a time to live in response to that probing for a target IP address fails;
probe the target IP address through a detection protocol group;
in response to the probing succeeding, record a round-trip time corresponding to the probing succeeding, and terminate the probing for the target IP address; and
in response to the probing failing, determine whether to update the reference tracking hop count, and determine whether to terminate the probing for the target IP address.

16. The system according to claim 15, wherein the probe system is further configured to:
send a request packet to the target IP address based on a current probe protocol in the probe protocol group; and
in response to the target IP address feeding back a response packet to the request packet, calculate a time difference between the request packet and the response packet, and take the time difference as the round-trip time corresponding to the probing succeeding.

17. The system according to claim 16, wherein a probe protocol in the probe protocol group includes a user datagram protocol (UDP), the request packet is a UDP probe packet, and the response packet is an Internet control message protocol (ICMP) destination unreachable packet;
the probe protocol in the probe protocol group includes a transmission control protocol, TCP, the request packet is a TCP SYN probe packet, and the response packet is a TCP ACK packet; and
the probe protocol in the probe protocol group includes an Internet control message protocol (ICMP), the request packet is an ICMP echo request probe packet, and the response packet is an ICMP echo reply packet.

18. The system according to claim 16, wherein the probe system is further configured to:
in response to the target IP address not feeding back the response packet for the request packet, acquire a timeout packet with a maximum time to live sent back by an intermediate gateway; and
calculate a time difference between the timeout packet and the request packet, and take the time difference as the round-trip time corresponding to the probing succeeding.

* * * * *